(12) United States Patent
Patterson et al.

(10) Patent No.: US 8,887,592 B2
(45) Date of Patent: Nov. 18, 2014

(54) SPHERICAL INVOLUTE GEAR COUPLING

(75) Inventors: Curtis Patterson, Calgary (CA);
Alejandro Juan, Calgary (CA);
Kristjan Gottfried, Vancouver (CA)

(73) Assignee: Exponential Technologies, Inc., Calgary (CA)

( * ) Notice: Subject to any disclaimer, the term of this patent is extended or adjusted under 35 U.S.C. 154(b) by 212 days.

(21) Appl. No.: 13/467,628

(22) Filed: May 9, 2012

(65) Prior Publication Data

US 2012/0285282 A1    Nov. 15, 2012

Related U.S. Application Data

(60) Provisional application No. 61/484,010, filed on May 9, 2011.

(51) Int. Cl.
| *F16H 1/12* | (2006.01) |
| *F04C 3/08* | (2006.01) |
| *F04C 2/08* | (2006.01) |
| *F16D 3/18* | (2006.01) |

(52) U.S. Cl.
CPC . *F04C 2/084* (2013.01); *F04C 3/08* (2013.01); *F16D 3/185* (2013.01)
USPC ............................................. 74/416; 464/149

(58) Field of Classification Search
CPC .............. F16D 1/00; F16D 3/18; F16D 3/80; F16D 3/185; F16H 1/006; F04C 3/08; F04C 2/084
USPC .................................... 74/416; 464/149, 157
See application file for complete search history.

(56) References Cited

U.S. PATENT DOCUMENTS

| 514,990 | A | * | 2/1894 | Habersang et al. | ......... | 74/665 R |
| 815,485 | A | * | 3/1906 | Stewart | ......................... | 464/119 |
| 855,106 | A | * | 5/1907 | Hensel | ......................... | 464/115 |
| 1,682,759 | A | * | 9/1928 | Kocourek | ..................... | 464/109 |

(Continued)

FOREIGN PATENT DOCUMENTS

| CA | 1080990 | 8/1980 | | |
| KR | WO2011025160 | 3/2011 | | |
| WO | WO 9533936 A1 | * 12/1995 | ............... | F16H 3/18 |
| WO | WO 9911944 A1 | * 3/1999 | | |

OTHER PUBLICATIONS

Gear Coupling: http://en.wikipedia.orgwikiGear_coupling. May 4, 2011.

*Primary Examiner* — David M Fenstermacher
(74) *Attorney, Agent, or Firm* — Dwayne E. Rogge; Schacht Law Office, Inc.

(57) ABSTRACT

Disclosed herein are several embodiments of rotors (gears) which utilize spherical involute curves to determine the surfaces of the lobes (teeth). In some embodiments the contact surfaces are radial projections of spherical involute surfaces. In other embodiments the contact surfaces have a root and/or tip of a spherical involute curve, but are barreled or otherwise curved to reduce the point stress on each rotor. The rotors may also be configured where torque transfer is provided at a first set of lobes (teeth) and backlash removal is provided on teeth radially opposed to the first set of lobes (teeth). As the apparatus rotates, the position of torque transfer remains substantially the same, as does backlash prevention/removal, but the teeth providing these operations vary. The rotors may also be used for fluid flow.

19 Claims, 17 Drawing Sheets

(56) References Cited

U.S. PATENT DOCUMENTS

| | | | | |
|---|---|---|---|---|
| 1,739,756 A | * | 12/1929 | Granville | 464/149 |
| 1,804,475 A | * | 5/1931 | Nash | 74/505 |
| 2,266,108 A | * | 12/1941 | Welter | 74/380 |
| 2,316,243 A | * | 4/1943 | Hubbard | 81/57.26 |
| RE22,555 E | * | 10/1944 | Brooks | 74/468 |
| 2,397,003 A | * | 3/1946 | Hambelton | 74/380 |
| 2,551,735 A | * | 5/1951 | Goff | 464/149 |
| 2,578,763 A | * | 12/1951 | Trbojevich | 464/142 |
| 2,578,764 A | * | 12/1951 | Trbojevich | 464/142 |
| 3,103,126 A | * | 9/1963 | Textrom | 474/211 |
| 3,141,313 A | * | 7/1964 | Brickett et al. | 464/97 |
| 3,884,050 A | * | 5/1975 | Borcuk | 464/137 |
| 3,911,759 A | * | 10/1975 | Tanaka et al. | 74/492 |
| 3,927,899 A | * | 12/1975 | Bough | 280/775 |
| 4,947,942 A | * | 8/1990 | Lightle et al. | 173/216 |
| 4,969,371 A | * | 11/1990 | Allen | 74/462 |
| 5,613,914 A | | 3/1997 | Gleasman et al. | |
| 2001/0055992 A1 | * | 12/2001 | Basstein | 464/157 |
| 2007/0274853 A1 | | 11/2007 | Merendeiro et al. | |

\* cited by examiner

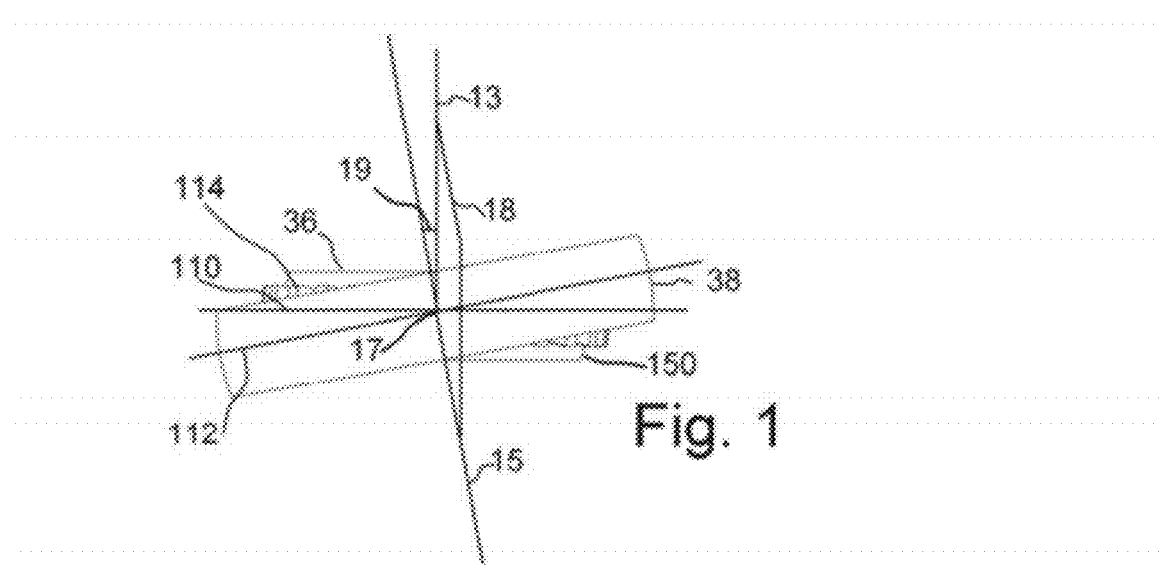
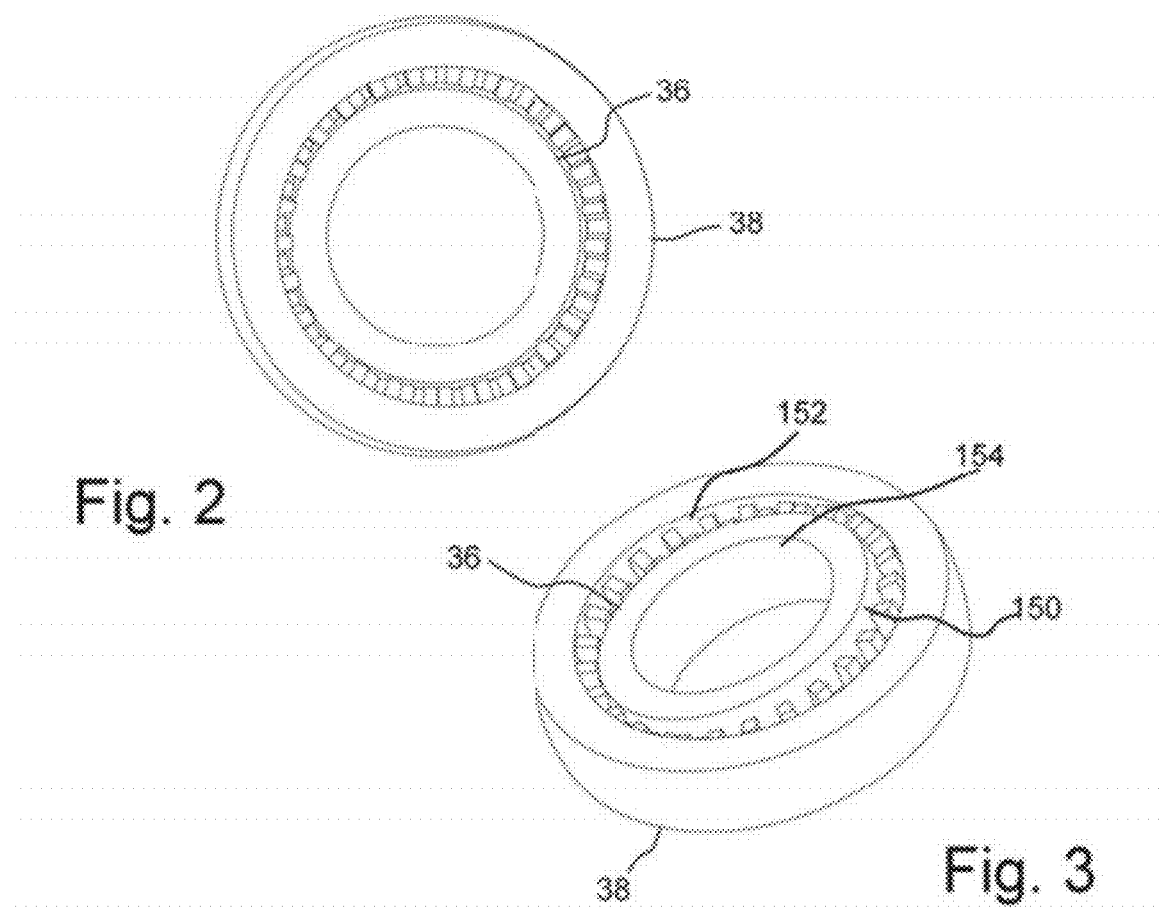

SPHERICAL INVOLUTE GEAR COUPLING

RELATED APPLICATIONS

This application claims priority benefit of U.S. Ser. No. 61/484,010, filed May 9, 2011 incorporated herein by reference for supporting information.

BACKGROUND OF THE DISCLOSURE

Field of the Disclosure

This disclosure relates to the field of spherical involute gear couplings (SIGC).

SUMMARY OF THE DISCLOSURE

Disclosed herein is a spherical involute gear coupling comprising a first gear having a first axis of rotation and a second gear having a second axis of rotation. The first gear and the second gear each comprising a plurality of teeth. The teeth having engagement surfaces configured to engage contact surfaces on teeth of the opposing gear, and wherein the engagement surfaces comprise spherical involute curves. Wherein a first set of teeth on the first gear, and a first set of teeth on the second gear contact on first a circumferential side of the first sets of teeth for torque transfer. Wherein a second set of teeth on the first gear, and a second set of teeth on the second gear contact a second circumferential side of the second sets of teeth upon reversal of the gear coupling for backlash prevention; and wherein the first sets of teeth are radially opposed to the second sets of teeth.

The spherical involute gear coupling as disclosed may be arranged wherein the first gear comprises an inner ring having an axis of rotation, a radially inward surface, and a spherical radially outward surface. Wherein the teeth of the first gear extend radially away from the radially outward surface of the inner ring. Wherein each tooth of the first gear comprises a first circumferential surface. Wherein the first circumferential surface of each tooth of the first gear is a radial projection of a first spherical involute curve away from the axis of rotation of the inner ring. In one form the second gear comprises: an outer ring having an axis of rotation, a spherical radially inward surface, a radially outward surface; and upper and lower axial sides. Also disclosed are a plurality of gear teeth extending radially away from the radially outward surface of the inner ring toward the axis of rotation of the outer ring; and wherein the first circumferential surface of each gear tooth is a radial projection of a second spherical involute curve toward the axis of rotation of the outer ring.

The spherical involute gear coupling as disclosed may be arranged wherein: the first gear comprises: an inner ring having a radially inward surface, a spherical radially outward surface; and upper and lower axial sides. The teeth of the first gear in one form extend radially away from the radially outward surface of the inner ring. Wherein each tooth of the gear comprises a first circumferential contact surface. Wherein each tooth of the first gear comprises a root curve, and each root curve is a spherical involute curve. The second gear in one form comprises: an outer ring having an axis of rotation, a spherical radially inward surface, a radially outward surface; and upper and lower axial sides. The second gear in one form also comprises a plurality of gear teeth extending radially away from the radially outward surface of the inner ring toward the axis of rotation of the outer ring; and wherein each tooth comprises a root curve, and each root is a spherical involute curve.

The spherical involute gear coupling as disclosed may also be arranged wherein a radially outward surface of the second gear is spherical.

The spherical involute gear coupling as disclosed may be arranged wherein the spherical involute curves are axially symmetric about a bisection plane normal to the axis of rotation of the associated gear.

The spherical involute gear coupling as disclosed may comprise a backlash value which is dependant upon the axis of rotation of the second gear relative to the axis of rotation of the first gear.

The spherical involute gear coupling as disclosed may be arranged where the axis of rotation of the first gear and the axis of rotation of the second gear are offset from co-linear and intersect.

The spherical involute gear coupling as disclosed may be arranged wherein the contact surfaces are radial projections of a spherical involute curve non-linearly, through a radial projection curve.

The spherical involute gear coupling as disclosed may be arranged wherein the radial projection curve is a spherical involute.

The spherical involute gear coupling as disclosed may be arranged wherein the radial projection provides a convex contact surface on the first circumferential side of the teeth of the first gear; and the radial projection provides a concave contact surface on the first circumferential side of the teeth of the second gear.

The spherical involute gear coupling as disclosed may be arranged wherein the radial projection provides a concave projection of a spherical involute curve forming a contact surface on the first circumferential side of the teeth of the first gear; and the radial projection provides a convex projection of a spherical involute curve forming a contact surface on the first circumferential side of the teeth of the second gear.

The spherical involute gear coupling as disclosed may be arranged wherein the radial projection provides a linear projection of a spherical involute curve forming a contact surface on the first circumferential side of the teeth of the first gear; and the radial projection provides a linear convex projection of a spherical involute curve forming a contact surface on the first circumferential side of the teeth of the second gear.

The spherical involute gear coupling as disclosed may be arranged wherein the first circumferential sides of each gear further comprise:
 a. surfaces defining buckets, and
 b. where the surfaces defining buckets are formed by minimum required removal of material to allow intermeshing of the first and the second gears,
 c. minimum material removal of the gear tooth resulting in the bucket surface,
 d. wherein the bucket surface is defined by the motion of the periphery of an opposing gear tooth tip, as the first and second gears rotate on their respective axis which are offset from collinear, at equal rotational speeds. a reference axis fixed to the center axis of the opposing gear and rotating the reference axis with respect to the center axis of the offset surface whereas the distance from the reference axis to form the engagement tip of the opposing gear determines the location of the surface of the bucket The spherical involute gear coupling as disclosed may be arranged wherein there is an interference fit between the tip of the opposing gear and the surface of the bucket.

The spherical involute gear coupling may be arranged wherein there is a prescribed gap between the tip of the opposing gear and the adjacent surface of the bucket.

The spherical involute gear coupling as disclosed may be arranged wherein contact surfaces on each gear are joined together by smooth joining surfaces. The joining surfaces on a first gear and on a second gear in one form comprise a first gear's engagement curves that lie in spherical planes. In one form each engagement curve is defined by a plurality of points, each point having an associated position derivative vector indicating a direction of tangency to the first gear's engagement curve, relative motion vectors at each point along the first gear's engagement curve, the relative motion vectors defined as the motion vectors of each point on the first gear's engagement curve measured with respect to a coordinate system rigidly fixed to the second gear. The relative motion vectors are dependent on the relative rotational positions of the first gear with respect to the second gear; and; the second gear in one form having a center rotation axis that is offset from co-linear to the first gear. The second gear may rotate at a prescribed rotational speed with respect to the first gear. The second gear may have second protrusions (teeth) connection engagement surface with a second set of engagement spherical curves positioned in the spherical planes of the second gear where the plurality of points forming the second gear's engagement curve measured on a coordinate system rigidly fixed to the second gear, each point of these plurality of points corresponds to a specific rotational position of the two gears, each point created at the geometric location where one of the first gear curve position derivative vectors is co-linear with one of the first gear curve relative motion vectors, where the first and second gear curves lie on equal diameter spherical planes, and further where the coordinates of the position derivative vectors and the relative motion vectors are the same defines a reference point, and the locus of these points on any given spherical plane determines the second gear's engagement curves on the corresponding spherical plane shared by the two gears.

The spherical involute gear coupling as disclosed may further comprise: a substantially spherical outer shroud surrounding and partially encapsulating the gear teeth such that no fluid communication can occur across gear teeth.

The spherical involute gear coupling as recited in claim 17 further comprising surfaces defining ports in a back face of the gear for backface porting of fluids in a fluid transfer device.

The spherical involute gear coupling as disclosed may further comprise crowning on the spherical involute surfaces to reduce stresses at the edges of the teeth.

BRIEF DESCRIPTION OF THE DRAWINGS

FIG. 1 is a side view of one embodiment of a gear pair coupling using the disclosed involute surfaces.

FIG. 2 is a top view of the embodiment of FIG. 1.

FIG. 3 is an isometric view of the embodiment of FIG. 1.

DESCRIPTION OF THE PREFERRED EMBODIMENTS

Figure 5:
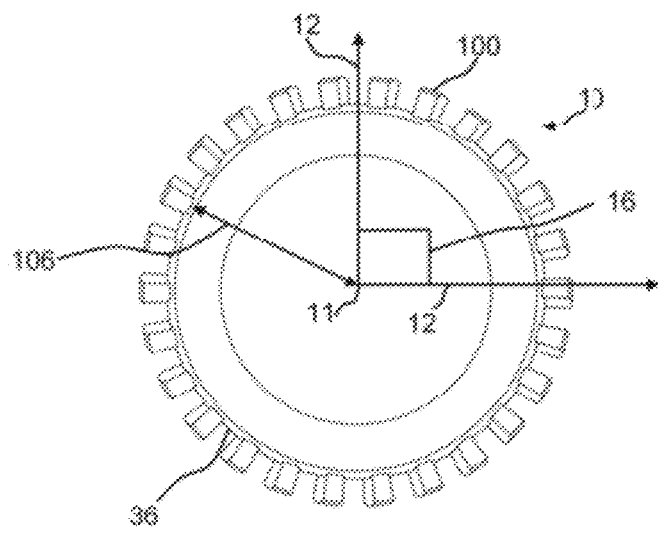
FIG. 5 is a top view of the inner gear according to the embodiment of FIG. 1.
Figure 7:
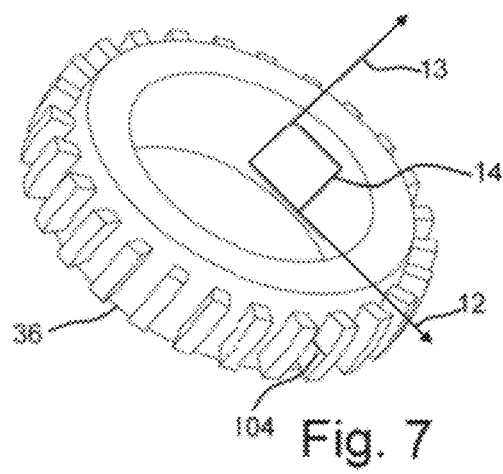
FIG. 7 is an isometric view of the inner gear according to the embodiment of FIG. 1.
Figure 8:
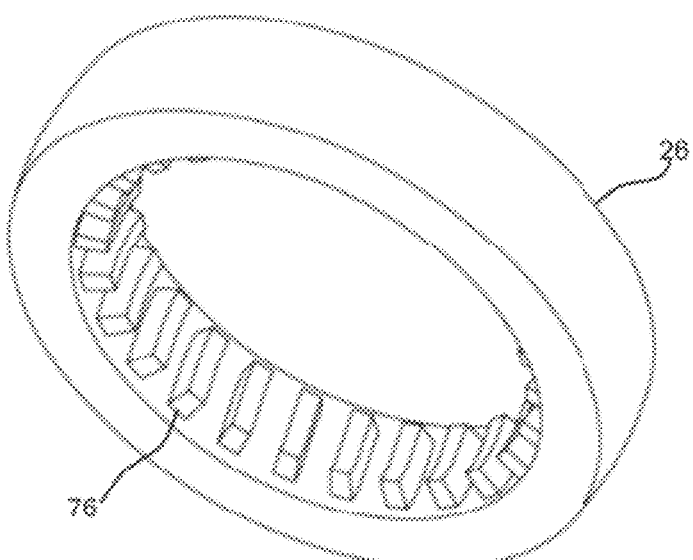
FIG. 8 is an isometric view of the outer gear according to the embodiment of FIG. 1.
Figure 9:
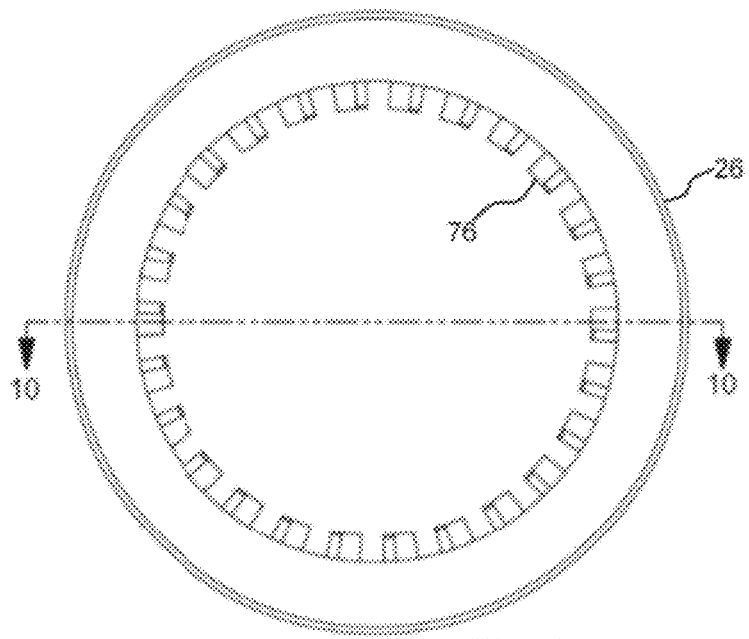
FIG. 9 is a top view of the outer gear according to the embodiment of FIG. 1.
Figure 10:
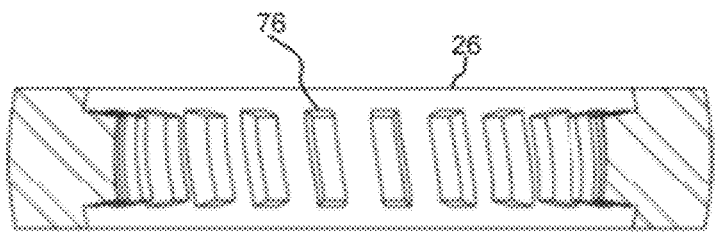
FIG. 10 is a cutaway view of the outer gear according to the embodiment of FIG. 1 along line 10-10.

Before beginning a detailed description of the embodiments, an axes system 10 is disclosed. In FIG. 5 for example, a top or plan view of an inner gear 36 is provided where the center of the gear is shown at 11, and a radial direction 12 extends outward therefrom within the plane of rotation of the inner gear 36 in any direction. As this disclosure relates to gear and rotor pairs which may rotate about different axes, the radial direction, and plane of rotation (circumferential plane) 16 may be different for each gear. In FIG. 1, for example, inner gear 36 rotates about axis 13, while outer gear 38 rotates about axis 15. The angle between these axes in a plane containing both the axes 13 and 15 is defined herein as an axes offset angle 19. Each of these gears may have different and intersecting planes of rotation. In this Fig., the axes are offset from each other, but intersect at point 17. The plane coincident with both axes is termed the angle plane 18. The plane 18 lies in the plane of the page. In FIG. 7, the inner gear 36 is shown with one radial direction 12 shown, along with the relevant axis of rotation 13. The radial direction 12 and axis 13 define a radial plane 14, of which there are an infinite number passing through the axis 13 and extending outward therefrom. Each radial plane 14 is orthogonal to the circumferential plane 16 as shown in FIG. 5.

These axes, directions, and planes are used to assist in describing the embodiments, and are not invented to limit the disclosure to a particular orientation or relative mode of operation.

When a straight line rolls along a stationary circle, a point on the line traces a curve called an involute (of the circle). When a circle rolls along a stationary straight line a point on the circumference of the circle traces a curve called a cycloid. When a circle rolls along another circle then a point on the circumference of the rolling circle traces out a curve called an epicycloid (if the rolling circle rolls on the outside of the stationary circle) or a hypocycloid (if the rolling circle rolls on the inside of the stationary circle). In all these cases of rolling circles points not on the circumference trace curves called trochoids.

All of the curves described above involve straight lines and circles in the plane. However, the same geometries can be applied to a sphere. The curves on a sphere that correspond to straight lines are the great circles (circles that divide the sphere into two equal halves) because great circles have the same symmetries on the spherical surface as do straight lines on the plane. On a sphere the "straight" lines are also circles. A circle on a spherical surface forms a cone from the center of the sphere; in the case of a great circle this cone is actually a planar disk. These cones and discs may be used to produce on a sphere the rolling of circles on circles.

The involute form has many advantages including close approximation to a rolling contact when two involutes are in synchronous rotating contact with one another when the central axis of the base cones of the involutes are offset from collinear. In this disclosure, an involute curve is defined as the curve described by the free end of a thread as it is wound around another curve, the evolute, such that its normals are tangential to the evolute. A more thorough description is provided below.

Figure 31:
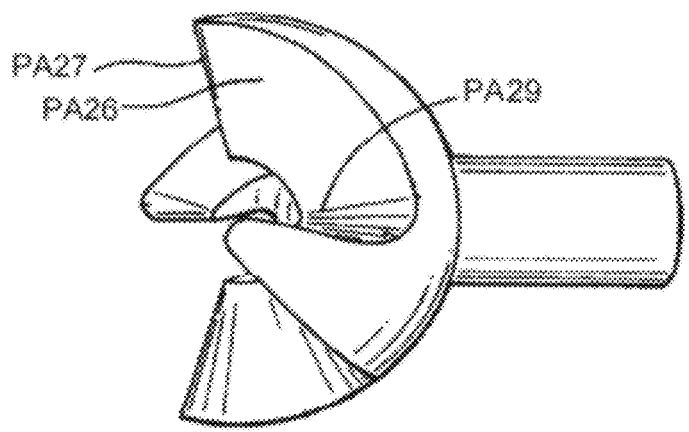
FIG. 31 shows a prior art rotor and shaft.

The term "teardrop" is used herein as a portion of a curve created by the radially outward edge of a teardrop shape, bisected by a plane passing through the long axis of the teardrop. The teardrop lies on the surface of a spherical plane. However, using FIG. 7A from the '463 patent as an illustration of prior rotors, currently presented as FIG. 31, an improved surface may be formed on similar rotors/gears using a novel method that improves contact and load transfer between the gears of a gear coupling.

This spherical involute curve surface may be created by a plurality of spherical involute curves. Using FIG. 23 of this disclosure as an example, a first spherical involute curve 39 lies on an outer spherical plane substantially corresponding to the outside diameter of the gear 42. A second spherical involute 40 lies toward the inward surface of the gear 42. The first 39 and second 40 involute curves need not be radial projections of each other; rather, they may have different pitches for example. The first 39 and second involutes 40 may be connected in one embodiment by a connecting surface 44 where this surface contacts the surface of the opposing gear, the term "contact surface" will be used in this disclosure. This connecting surface 44 in one form can be conceived as being composed of a radial projection of the curve 40 outward from the center of the gear 42. The mating gear in one form may also have surfaces with a similar spherical involute surface, such that the involute curve surfaces 39/40 on the first gear 42 mesh (contact) with the involute curve surfaces of the mating gear.

Figure 28:
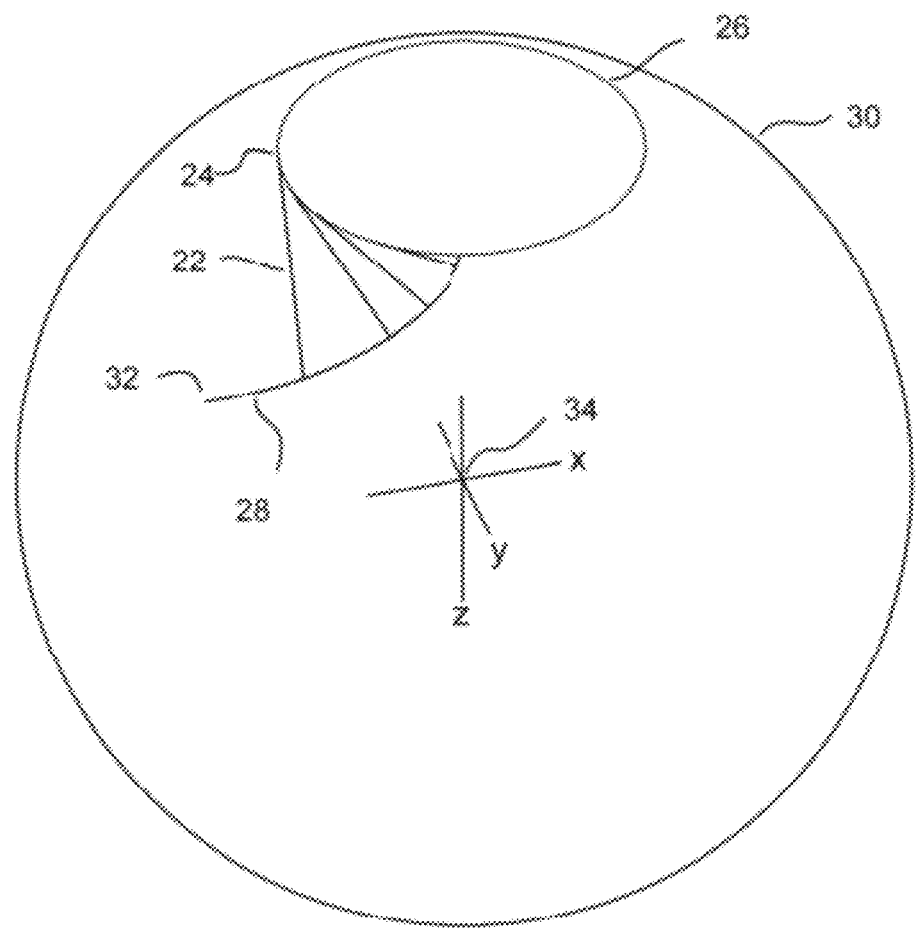
FIG. 28 is a depiction of one embodiment of a mathematical construct of an involute curve on the surface of a sphere.
Figure 29:
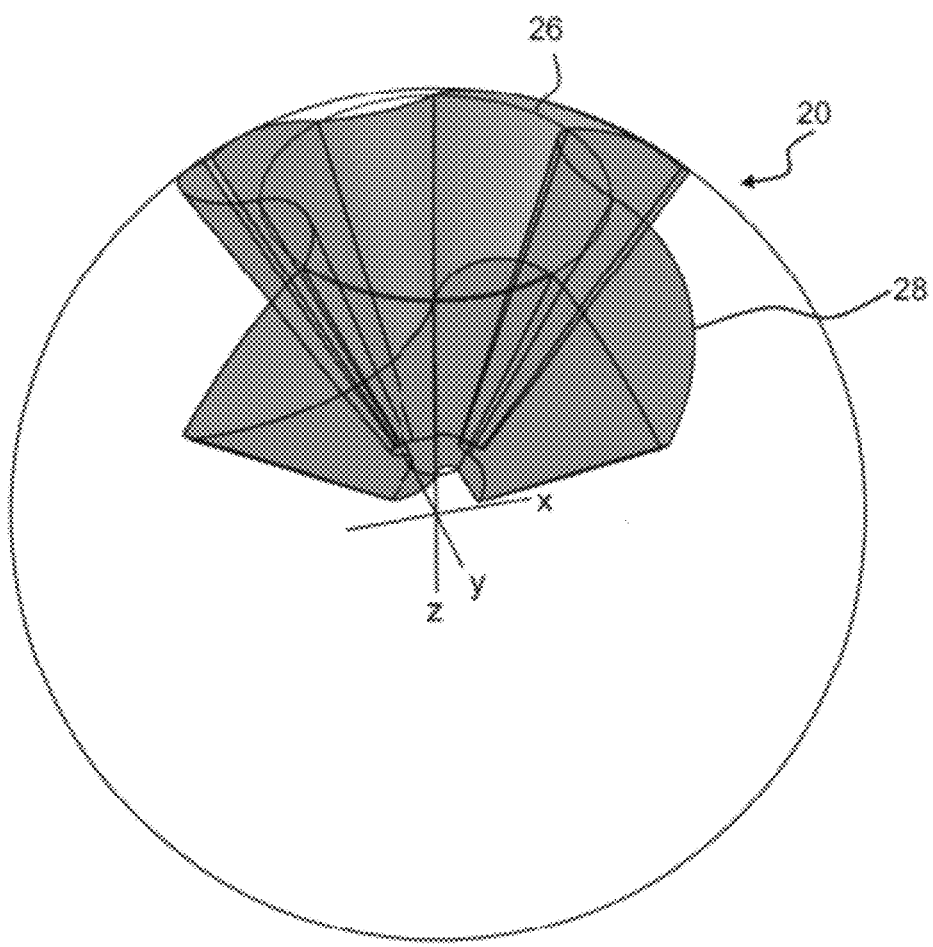
FIG. 29 is a depiction of one embodiment of a surface defined (formed) by a series of involute curve constructs extending from the outer surface of a reference sphere toward the center of the sphere.
Figure 30:
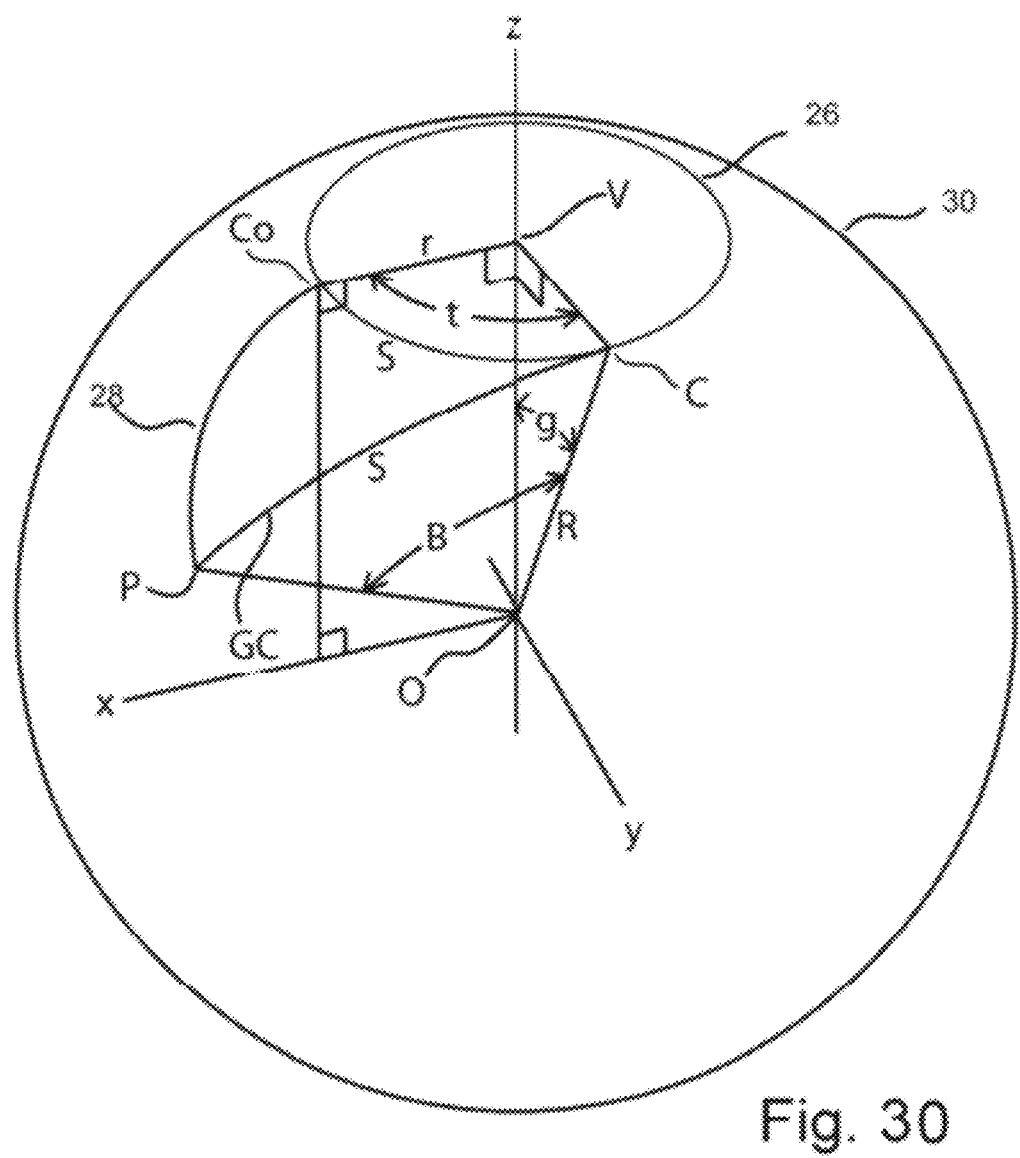
FIG. 30 shows one embodiment of a geometric framework for deriving the mathematics of a spherical involute curve.

As shown in FIGS. 28-30 particular form of an involute curve is a spherical involute 20 which may be conceived as the set of points traversed by the tip of a string, as a string is unwound from a base circle 26 upon the surface of a sphere while keeping the string pulled tight, the base circle 26 being inscribed on the surface of a sphere. FIG. 28 illustrates this concept, where point 32 is the tip of the string 22, and points along the spherical involute curve 28 are created by the taught string 22 at various positions of being unwrapped. In one form, the string 22 forms a point of tangency 24 with the base circle 26. In one form, the string 22 is not a straight line, but rather, a great circle (a circle with center at sphere origin 34). FIG. 29 with spherical involute curve 28 illustrates one application of a spherical involute surface.

To derive a mathematical construct of the spherical involute shape, one method is to use a series of vector rotations about a common center point. FIG. 30 illustrates this mathematical construct, with the assumption that the "string" being unwound starts being unwound at a point Co, aligned with the x-axis, and unraveling occurs in the counterclockwise direction, or rather, in a positive rotational direction about the z-axis by the right-hand-rule. Let "t" represent the angular position of the tangent point C located on the base circle. This tangent point traverses the base circle in a counter clockwise direction as point P of string GC is pulled off of the base circle. The arc length of great circle "GC" is equal to the arc length of the circular arc of the base circle between points Co and C and is denoted by S. Using the base circle 26, the arc length S=rt, where r is the radius of the base circle 26, t is the tangent point angle shown in FIG. 30. The half-angle of the base cone, as "g" is illustrated in FIG. 3, where the right triangle O V C demonstrates g=a sin(r/R) which can be rewritten as r=R sin(g) or r/R=sin(g), where R is the radius of the spherical plane of the involute. For spherical-sided triangle P C O, we can write a relation S=RB, that is, angle B multiplied by radius R equals arc length S. Combine S=rt with S=RB to obtain rt=RB or r/R=B/t. For convenience, it is disclosed in one embodiment to write angle B in terms of g. To accomplish this, substitute r/R=B/t into g=a sin(r/R), thus B=t sin(g). A series of vector rotations in x y z Cartesian coordinates about the common center O illustrated in FIG. 3 can now be performed in a series of steps. First, rotate vector V=[0,0,R] by +B about the x-axis using the right hand rule. Second, rotate this result by +g about the y-axis. Third, rotate this second result by angle "t" about the z-axis. Below are the series of matrix rotations and resulting parametric equation for a spherical involute in Cartesian coordinates:

$$\text{Involute} = \begin{bmatrix} \cos(t) & -\sin(t) & 0 \\ \sin(t) & \cos(t) & 0 \\ 0 & 0 & 1 \end{bmatrix} \begin{bmatrix} \cos(g) & 0 & \sin(g) \\ 0 & 1 & 0 \\ -\sin(g) & 0 & \cos(g) \end{bmatrix}$$

$$\begin{bmatrix} 1 & 0 & 0 \\ 0 & \cos(B) & -\sin(B) \\ 0 & \sin(B) & \cos(B) \end{bmatrix} \begin{bmatrix} 0 \\ 0 \\ R \end{bmatrix}$$

$$\text{Involute} = \begin{bmatrix} X(t) \\ Y(t) \\ Z(t) \end{bmatrix} = \begin{bmatrix} R\{\sin(t\sin(g))\sin(t) + \cos(t\sin(g))\cos(t)\sin(g)\} \\ R\{\cos(t\sin(g))\sin(g)\sin(t) - \sin(t\sin(g))\cos(t)\} \\ R\{\cos(t\sin(g))\cos(g)\} \end{bmatrix}$$

Where g=a sin(r/R), r being the radius of base circle 26 in FIG. 30 and R being the radius of the spherical surface 30 on which the spherical involute lies.

A spherical involute curve in one form may span the distance between two reference points on a sphere of radius R. By rotating the spherical involute curve about the z-axis the spherical involute curve is positioned accordingly. The base circle radius may be adjusted to control the "pitch" or slope of the involute curve. The angular position "t" controls the starting and ending points of the involute. A range of t values may be selected to precisely control the end points of the involute curve. There are limitations on the points that can be joined with a spherical involute. For example, end points P of the involute curve normally cannot lie outside of two base circles inscribed on the sphere, base circles centered on the z-axis and mirrored about the x-y plane. For points that lie between these base circles it is possible to connect some points with a spherical involute curve. One may also satisfy any tangency conditions at both points. For example, referring to FIG. 31, to produce an involute curve surface lobe instead of the simple curvilinear lobe shown, a first point could be defined as the location where edge PA27 intersects the spherical plane at one end, and the involute curve could be made to also pass through the point where edge PA29 intersects the spherical plane. One will then discard the rest of the involute curve, using only the segment that connects the two points. Tangency conditions could also be met such that the involute curve smoothly transitions from lobe tip end curves, or smoothly transitions at a root between two lobes.

Figure 4:
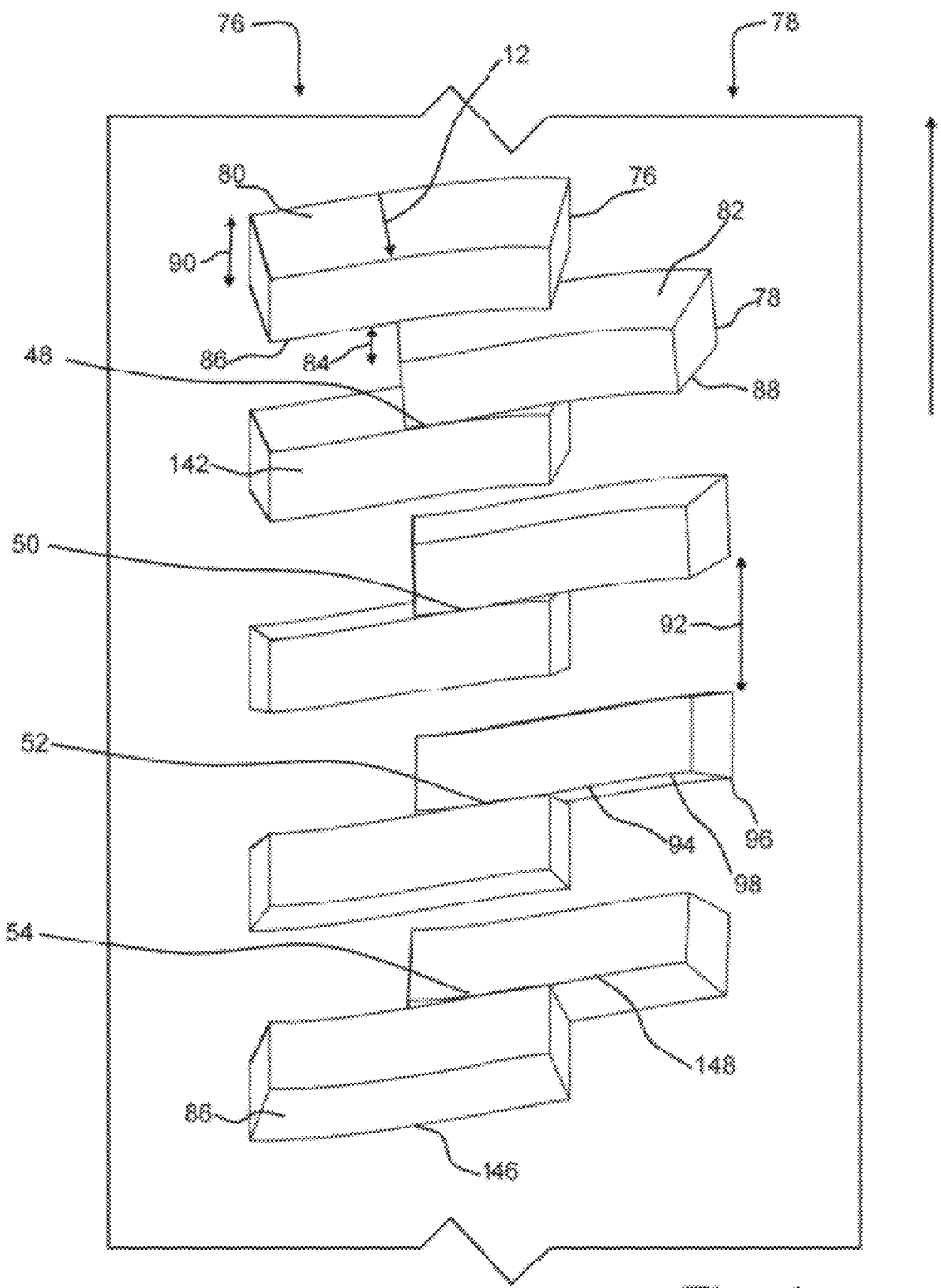
FIG. 4 is a detail view of the gear teeth of the embodiment of FIG. 1.
Figure 15:
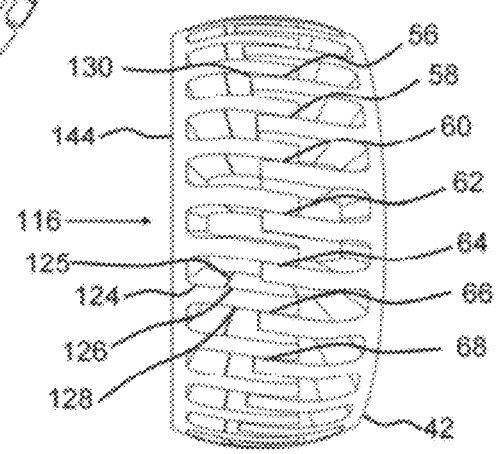
FIG. 15 is a side view of the embodiment of FIG. 13.
Figure 16:
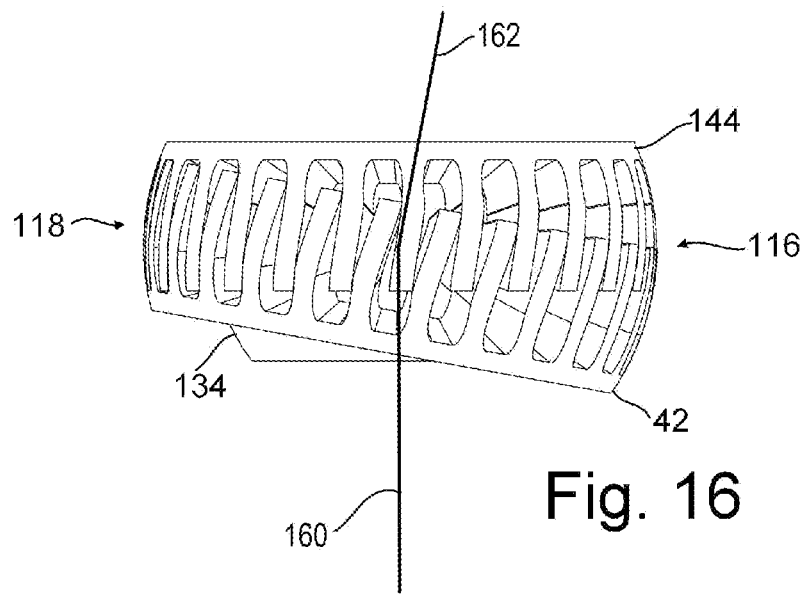
FIG. 16 is a side view of the embodiment of FIG. 13 from a different angle.

The use of the spherical involute has been found to allow much improved load transfer between gears of a gear pair through improved rolling contact between involute surfaces. In the example of FIG. 4, the gears are shown contacting at least at contact points 48-54. In FIG. 15 the gears (rotors) are contacting at least at points 56-68. The lobes can be designed in such a way that multiple lobes can have (rolling) involute to involute contact (as shown in FIG. 15), which further increases load carrying capacity.

This disclosure includes several embodiments of a device which is an improvement upon gear couplings which are used extensively in industry. The disclosed gear coupling contact surfaces may also be used as also a new type of bevel gear. The term "contact surfaces" used herein to describe those surfaces of each gear which engage contact surfaces on the opposing gear to transfer torque from one gear to the other, facilitate relative rotation of the gears, and/or facilitate fluid flow when the spherical involute surfaces are used on rotor lobes as will be described herein.

In addition to gear couplings and bevel gears, the spherical involute geometry used to produce the gear contact surfaces disclosed herein can be used to create embodiments for spherical fluid energy conversion/flow devices (pumps and expanders).

Figure 26:
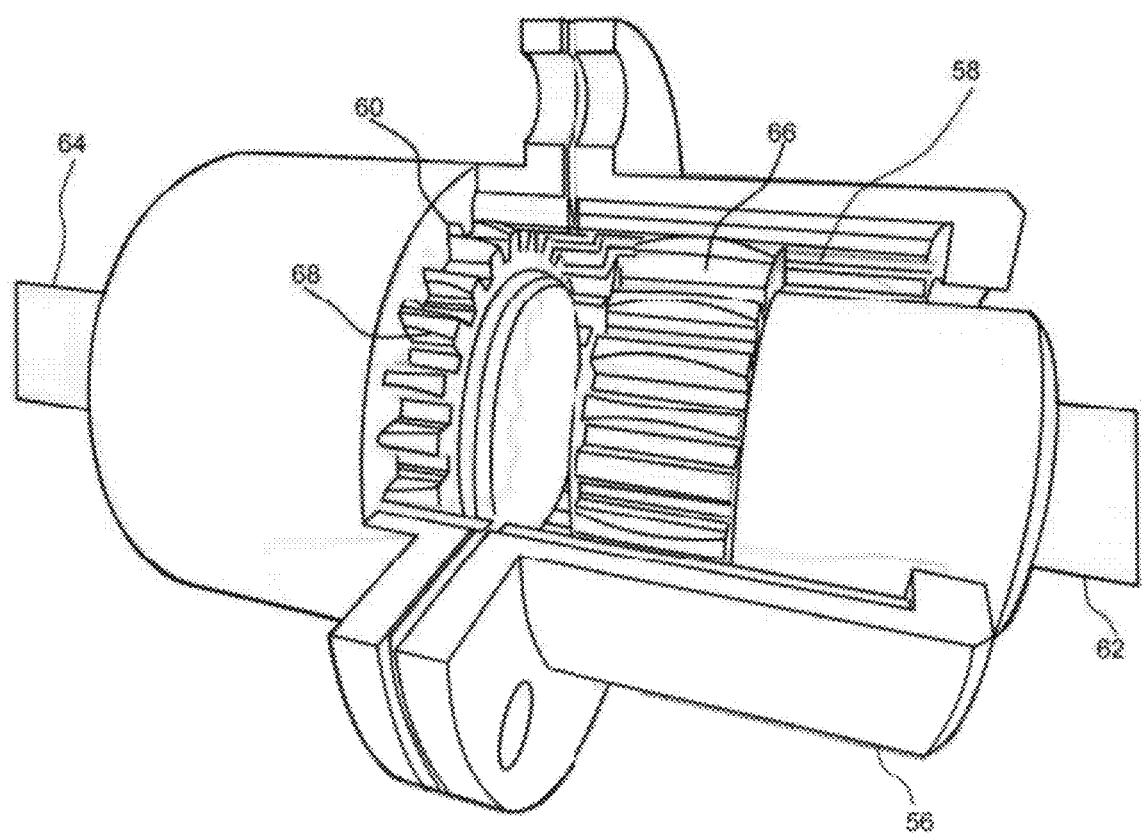
FIG. 26 shows a prior art splined coupling.
Figure 27:
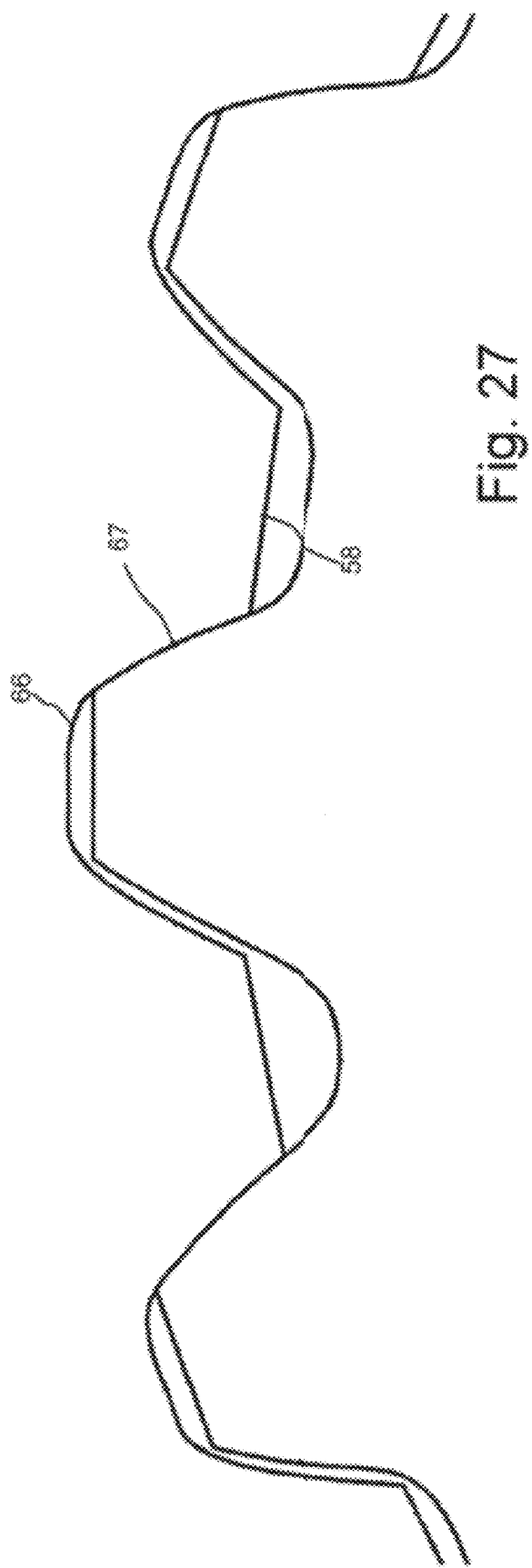
FIG. 27 shows a partial cutaway view of one embodiment of a splined coupling profile such as shown in FIG. 26.

The figures show several embodiments of single-joint gear couplings which in some embodiments can be utilized where the rotation axis of the mating gears may nominally intersect each other, but may be extended to gear couplings with aligned axis of rotation, such as a "spindle" embodiment. One such spindle embodiment is shown in FIG. 26. The term "Spindle" used herein to describe a cylinder where the inner surface of the cylinder has teeth thereon which engage teeth on a male component. This gear coupling includes an outer shroud 56 with two sets of female gear teeth 58/60 that mate with two separate and cooperative shafts 62/64, where in some embodiments, each shaft has one set of male gear teeth 66/68 engaging each other at contact points 67. This embodiment is well suited for shaft axes that rotate at different angles, especially where the axes of rotation do not intersect. To allow the same range of misalignment as the present art of gear couplings provide, embodiments of the improved spherical involute gear coupling may also provide misalignment capability in the axial direction. A straight spline, keyed coupling, or similar axial sliding device, may also be provided within the assembly to provide axial misalignment capability. This capability is shown in FIG. 26 where the female gear teeth 58 are axially longer than the cooperating male gear teeth 66. Thus, the gear teeth 66 can reposition axially along the female gear teeth 58, providing for misalignment correction or, movement of the shaft 62 relative to the shroud 56.

A comparison between the disclosed gear couplings in several embodiments and current gear couplings include:

SIGCs are similar in some general functions to bevel gears such as commonly found in the differential of a vehicle. An example of this is shown in U.S. Pat. No. 1,406,970 (incorporated herein by reference for supporting information) where FIG. 3 shows an internal bevel gear 35, which engages an external bevel gear 48. Also, U.S. Pat. No. 928,457 (also incorporated herein by reference) where FIG. 2, shows an internal bevel gear 10, and external bevel gear 11 that engages internal bevel gear 10.

The disclosed spherical involute gear coupling (SIGC) geometry is particularly suited to be utilized as a gear coupling where increased surface-surface rolling contact is desired, and sliding/frictional contact is not desired.

SIGC's contact surfaces are in spherical planes, unlike gear coupling splines where the involutes are normally constructed in a flat plane normal to the axis of a cylindrical outer sleeve.

SIGC exhibit nearly rolling contact, rather than sliding or frictional contact, at the contact surfaces when operating at an angle greater than zero, as the SIGC in some embodiments has true spherical involute profiles at the gear-gear contact surfaces. This design results in extremely low frictional contact between the contact surfaces of the gears.

Radii of curvature of the contact surfaces in some embodiments are very large resulting in lower contact stresses. When the axis of each shaft is collinear to the axis of the opposing shaft, friction becomes negligible and improved contact stresses result due to larger contact areas.

The contact angle is very favorable in the tangential torque direction.

SIGC can operate at shaft angles from zero up to a design maximum angle. Design maximum angles for some embodiments may be as much as 20 degrees.

Due to the spherical involute surfaces, SIGC can be designed with a zero backlash, or zero play, at the design maximum angle, and backlash may increase when the operating angle is lower than the design maximum.

Figure 25:
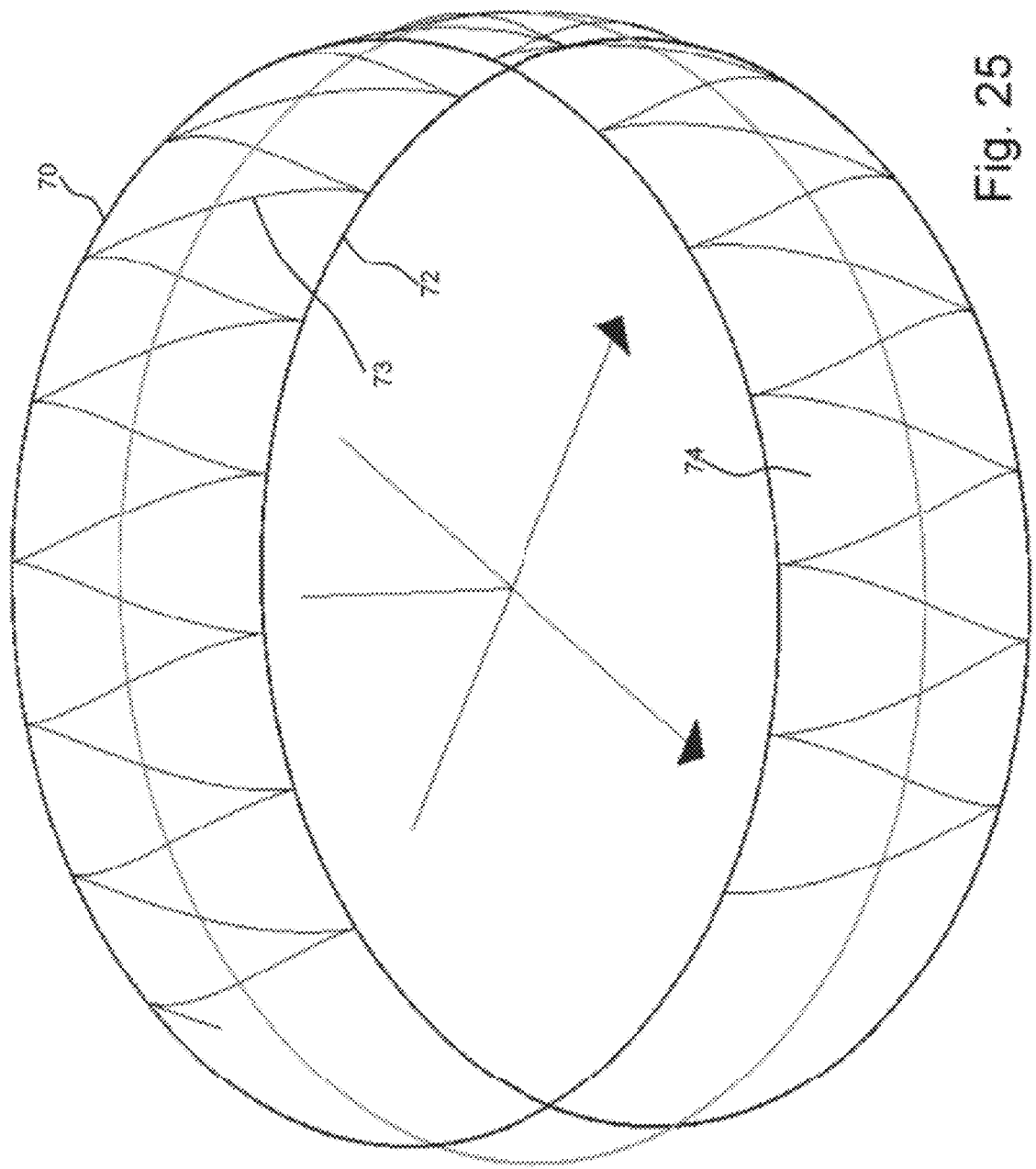
FIG. 25 shows a mathematical representation of the disclosed curves.

Spherical involutes exist between two base circles and cannot exist outside of them. For example, in FIG. 25, a mathematical construct of the involutes are the curves 73 constructed between two base circles 70 and 72, and result from the same mathematical equations presented herein, and also disclosed in U.S. patent application Ser. No. 13/452,157 filed on Apr. 20, 2012 and incorporated herein by reference. Using a large range of values for parameter "t" (see FIG. 30) results in multiple saw tooth shapes (teeth) 74 such as shown in FIG. 25. The SIGC has teeth 74 in one form extend nearly all the way to these base circles 70/72. This design allows for a greater number of teeth in contact between the gears of the gear pair during operation. SIGC embodiments may have teeth that do not extend all the way to the base circles 70/72 however, resulting in fewer teeth 74 in contact between gears or rotors.

A coupling pair may be formed by utilizing the same contact surfaces for the teeth on the inner coupling (gear), as for the outer coupling (gear). As depicted in FIG. 4, the same spherical involute surface 86 may be used on the set of teeth 76 of the female gear as the surfaces 82 used on a male gear and for the teeth 76/78 to intermesh by fitting the teeth 76/78 between each other as shown in FIG. 4. In one form, a prescribed gap 84 may be designed between the trailing surfaces 82/86 of adjacent teeth. This gap 84 may define the backlash value of the gear coupling, and may change through rotation of the gears. The backlash value may also change depending on the axes offset angle 19 between the axes of rotation of the two gears in the angle plane 18. In one form, each individual tooth 76 has the same involute curve (surface) 80/86 on each circumferential side of the tooth, that is, an involute curve surface forming the left circumferential side of a tooth may be the same surface as used on the right circumferential side of the tooth. One surface may be a rotated (mirror) copy of the opposing surface about the rotational axis of the coupling part (gear).

The involute curve surfaces may be designed in a way such that for a given maximum operating angle, one obtains a desirable backlash between the gears. With zero backlash, the gear coupling in certain applications may not operate properly, and may tend to bind. Thus, a small amount of backlash between gears may be beneficial. To accomplish the correct backlash, given a known set of base circles and axis offset angle, the thickness 90 of the teeth must be selected relative to distance 92 between adjacent teeth on the opposing rotor, to result in the desired backlash. The desired backlash can be less than, greater than, or equal to zero. The backlash would be less than zero for example in a pre-loaded embodiment. For a given tooth design, there may be a limited range of axes offset angles between zero and some value, that the coupling can operate effectively before the smooth involute contacts are no longer smooth but are contacting at the edges 94 of the teeth.

A pre-loaded condition may be beneficial in some applications. In particular, at least a portion of the teeth may be malleable to allow for pre-loading. Teeth may also have round radii on the edges 94. One may also design round radii at the roots 96 (proximal end) of the teeth for strength. The teeth may also/alternatively be rounded at the tip edges 98 that mate with the rounds at the roots 96, or provide some clearance if desired rather than have rounds mate.

The embodiment shown in FIGS. 1-7 discloses teeth 100 formed on the inner ring-like gear 36 by the radial 12 projection of a spherical involute curve 102 radially outward from the surface 138. In one form, the surface 138 of the gear is also a spherical section; in addition, the radially outward surfaces 140 of each tooth may be spherical sections. Similarly, as best seen in FIG. 4, the teeth 76 on the outer or female ring-like gear 38 may be radial projections of a spherical involute curve outward from the inner surface of the gear 38. In one form, the radially innermost surface 142 of the female part teeth 76 may be a spherical section. As shown with the radial involute projection, this design may result in tooth-to-tooth contact between opposing gears that are line contacts 104 that occur in the radial direction 12 towards the center 11 of the sphere (gear). In this embodiment, the contact between adjacent gear teeth forms a line on each contacting tooth. The line of contact 104 is shown in FIG. 7 at one line of contact upon a tooth at the contact position between the gear 36, which will be in contact with an opposing tooth on an opposing gear 26 which is not shown in this Fig. As the gears rotate, and as the relative axis of rotation may change, the position of this contact line may change on each tooth.

The teeth may also be designed so that the teeth are not radial projections of spherical involute surfaces, but some other type of smooth function such as constant tooth thickness, or tapered tooth thickness for example. The teeth may also be formed with barreling on the contact faces much like barreling on spiral bevel gears discussed in U.S. patent application Ser. No. 12/560,674 ('674) incorporated herein by reference. Such barreling could help allow for smoother running contact when the coupling is assembled slightly off-centers for example, and allow for some assembly misalignment and yet maintain Hertzian contacts over most of the tooth length. In such Hertzian contacts, one or both of the contact points (lines) is deflected from a contact point or line, resulting instead in a contact patch or region.

Looking to FIG. 4 again, the root curve 146 of the female part teeth 76 is shown. Although this root curve in one plane may be a simple curve, as it lies on the inner surface of the spherical or cylindrical female gear, it is also a spherical involute curve in a plane tangential to the surface of the gear from which it extends. Similarly, the root curve 148 of the male part teeth 78 is shown. Again, this root curve in one plane may be a simple curve as it lies on the outer surface of the spherical or cylindrical female gear; it is also a spherical involute curve in a plane tangential to the surface. In one form the contact surfaces are linear radial projections of these root curves, although they may also be curved projections, such as involute curved projections.

Figure 6:
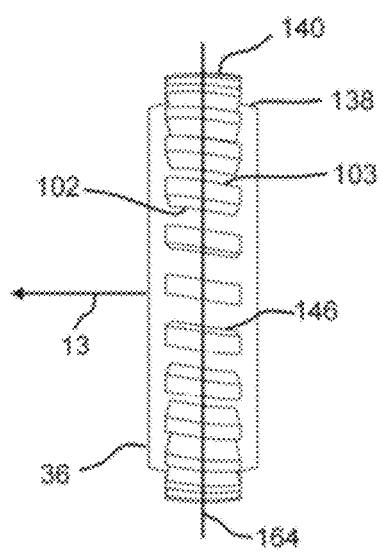
FIG. 6 is a side view of the inner gear according to the embodiment of FIG. 1.

In one form as shown in FIG. 6, the root curve 146 is bisected by a plane 164 which is normal to the axis of rotation 13 of the associated gear. The root curve 146 in one form may be substantially symmetric about this plane. In one form the first side of the root curve 146 is substantially a mirror image, mirrored a second time in the rotationally tangential direction (about a plane that is formed by the axis of revolution and a point formed by the intersection of plane 164 and the root curve) of the second side. In one form, the bisection plane 164 is not at the axial center of the gear.

As previously described, SIGC may be composed of spherical involute curves that are projected radially outward/inward from the axis of rotation of the gear. The SIGC design could be a direct replacement for timing gears. The SIGC may be formed where the teeth are not only spherical involutes in the axial direction 13, but can also/alternatively comprise involutes in a radial direction 12. That is, the contact surfaces may not be formed by a radial projection of straight lines, but may be involutes created in 2D that form the end-on profiles of the teeth.

The SIGC operates in an X-configuration rather than the V-configuration of the timing gears discussed in the '674 disclosure. In other terms, the teeth 100 as shown in FIG. 5 may be positioned such that the teeth are situated about a central axis 11 by some radial distance 106, and each lobe or tooth has some length 108 substantially in the axial direction 12. A first gear rotation plane 110 is shown in FIG. 1 which is normal to the axis 13 of the first gear 24, and passes through the mid-length position of each lobe or tooth 114 of the first gear 24. A second gear rotation plane 112 is shown which is normal to the axis 15 of the second, or outer gear 26, and passes through the mid-length position of each lobe or tooth of the second gear 26. As shown in FIG. 1, the intersection of these planes form an "X" and the intersection of these planes occurs at the common center 17, where the axes 13/15 of the two rotors 24/26 intersect. In many rotor/gear couplings the intersection of these planes cross at, or radially outward of the contact teeth. The "X" configuration differs from a "V" configuration in that a "V" configuration of bevel gears is defined as for example a typical set of bevel gears that often have external teeth and may be of similar diameter. One embodiment of a "V" configuration is the typical bevel gears in a car differential that form a 90 degree "V" when viewed from the side.

In one embodiment, the outer surface 150 of the inner gear 36 is spherical, although not a full sphere. Similarly, the inner surface 152 of the outer gear 38 may be spherical. The shaft surface 154 will generally be cylindrical in most embodiments.

With the zero backlash design tooth thickness previously defined, near-rolling contact groupings occur in two separate locations (groups), located substantially 180° in opposition circumferentially. One group transfers torque, the other group removes or reduces backlash. In gearing, when the direction of load of the driving gear is reversed, backlash is the clearance gap that exists between two sets of gear teeth that must close before the force from the reversed driving gear is experienced by the driven gear. Backlash is also referred to as lash, or play. For timing gears in machines that require very accurate motion, it is often important that the backlash be minimal. Backlash can be designed for a specific clearance gap, or the gear pair may utilize split gears and springs to accomplish the desired backlash. A gear pair with zero, or less than zero (pre-loaded) backlash, such as by utilizing a preload can be accomplished as well.

Figure 14:
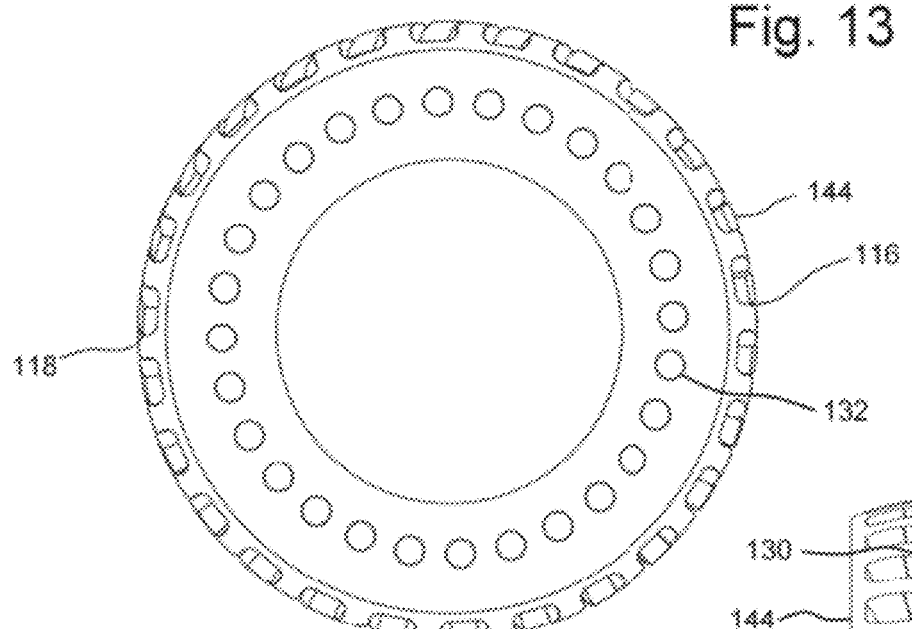
FIG. 14 is a top view of the embodiment of FIG. 13 additionally showing surfaces defining ports in the back side thereof.
Figure 17:
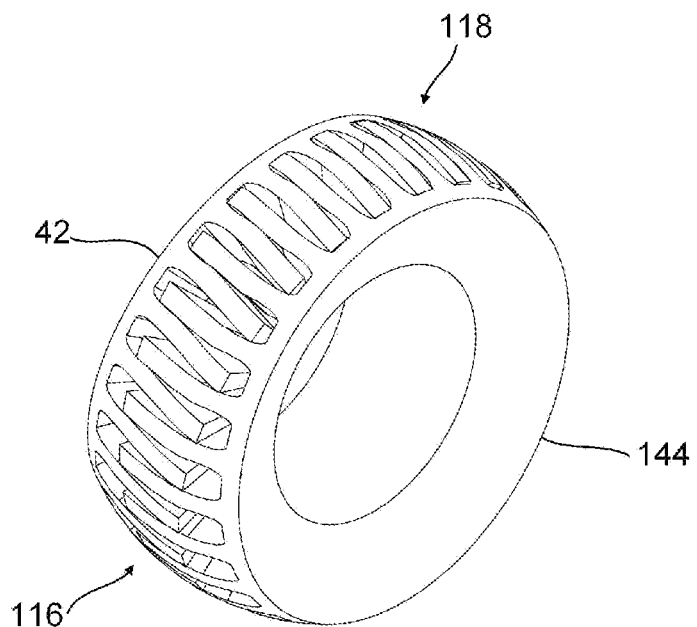
FIG. 17 is an isometric view of the embodiment of FIG. 13.
Figure 18:
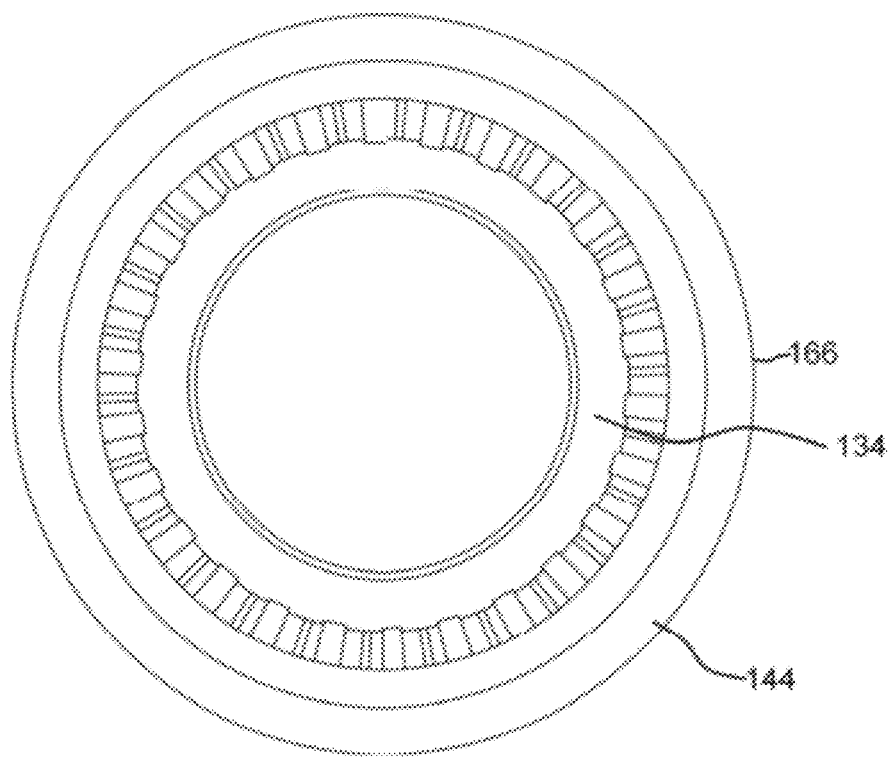
FIG. 18 is a top view of the outer rotor with the shroud shown in FIG. 12.
Figure 19:
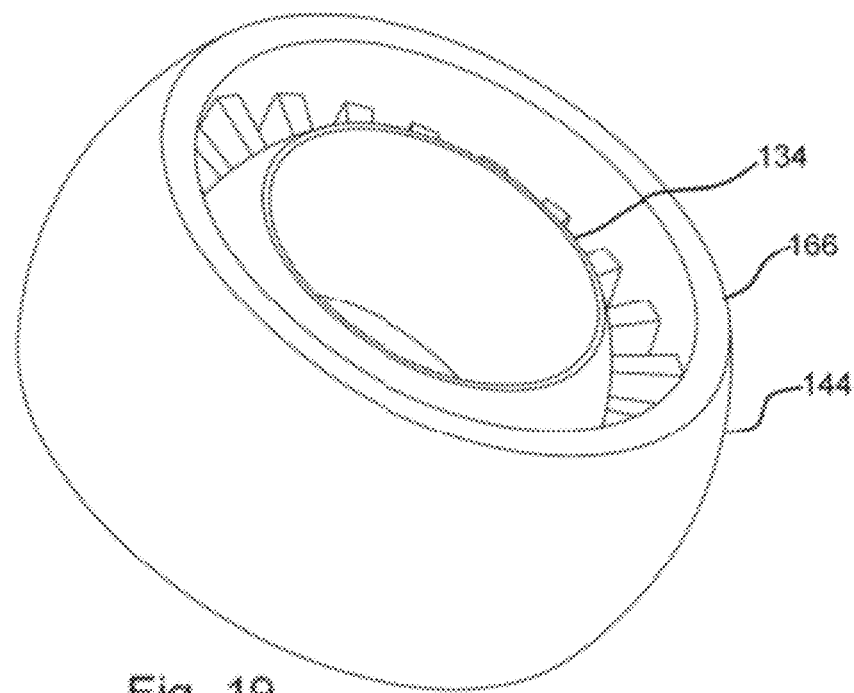
FIG. 19 is an isometric view of the embodiment of FIG. 18.
Figure 20:
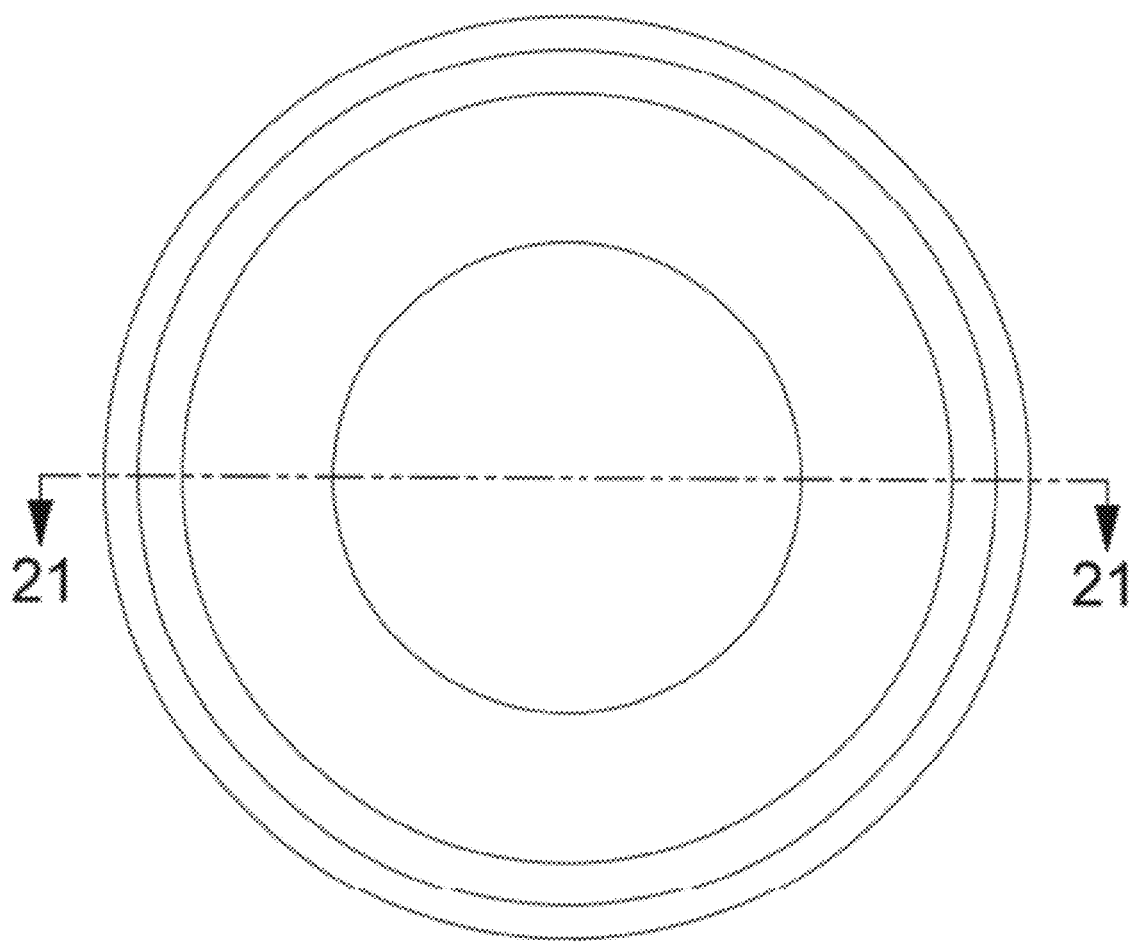
FIG. 20 is a bottom view of the embodiment of FIG. 18.
Figure 21:
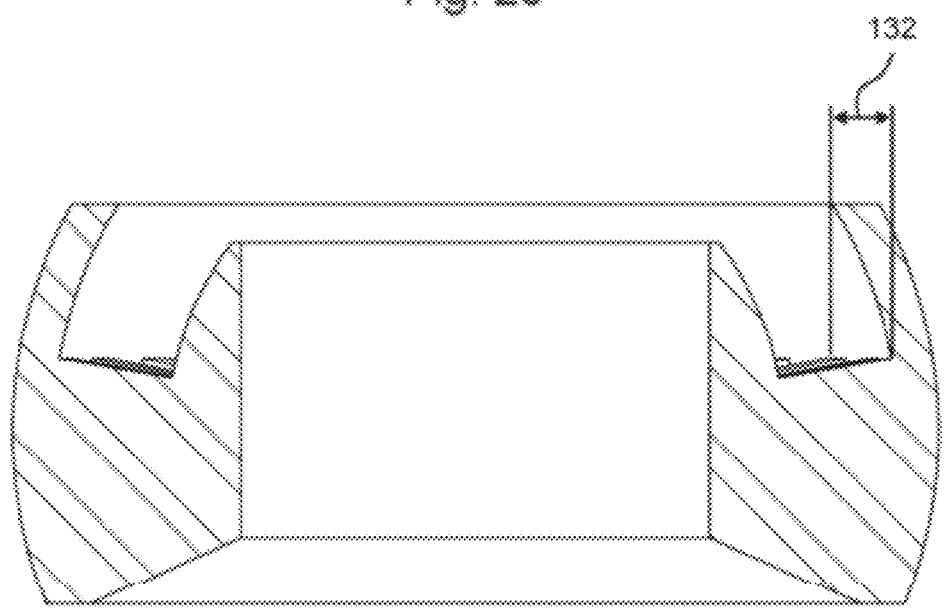
FIG. 21 is a cutaway view of the embodiment of FIG. 20 taken along line 21-21.

In one embodiment of the disclosed gear pair, one grouping of contact surfaces (gear teeth) transmits torque, the other grouping removes backlash. FIG. 15, showing the top-dead-center position 116, there is lobe to lobe contact 62 occurring in, say, torque transmission. The same device shown at bottom dead center position 118 in FIG. 17 shows the spherical involute contacts occurring in backlash removal. In other terms, as the lobes 122 and 123 are in contact at circumferentially opposite sides at the bottom dead center position 118 of FIG. 17, from the contact shown at the top dead center position 116 of FIG. 15, at the axes angle shown, backlash is prevented between the two rotors (gears) 42/144. The near-rolling involute torque transmission contacts and involute backlash removal contacts are occurring symmetrically, 180 degrees apart as can be seen in FIG. 14.

Gear couplings are commonly designed for either a small axes offset angle 19, or a large range of axes offset angles 19 such as the Torvec coupling described in U.S. Pat. No. 5,613, 914 incorporated herein by reference. The SIGC can be designed to operate at an infinite number of axis offset angles; from zero up to a design maximum (for example, for the embodiments shown in FIGS. 1-6, the design maximum may be about 10 degrees). In one embodiment, at the design maximum, the gear pair 24/26 can be designed for zero backlash. The gear pair can allow backlash at axes offset angle 19 less than the maximum. The gear pair can alternatively be run as a fixed angle coupling operating with high efficiency and minimal friction and high strength with a specific designed backlash.

Some embodiments of the SIGC are similar in some functional aspects to the "elongate involute" design in the '674 application. The elongate involute, with a suitable shroud and ball, can be a fluid energy conversion device as the fluid can be made to move in the axial direction of the device. Due to the axial pumping potential of the design in some embodiments such as the embodiment of FIG. 13-17, being limited, undercuts or "buckets" 124 to the backs 126 of the SIGC gear teeth 128, a pair of rotors such as shown those shown in the embodiments of FIGS. 13-17. A line 125 generally separates the spherical involute curve, from the teardrop, oval, or other shaped bucket. The "buckets" 124 are designed utilizing a theoretical model of the edges 130 of the SIGC teeth as "cutters", forming the buckets. In this particular configuration the "a" angle of the cutters is about 80 degrees and with a 10 degree axis offset angle, results in bucket shapes that are slightly oval rather than a true teardrop shape. The "a" angle is described in the '674 application. The oval buckets are constructed in much the same way as illustrated in the '674 application, FIGS. 5-10. The sides of the buckets in several embodiments are substantially aligned with the involute profiles, and can be made to have a smooth transition, and the SIGC teeth can have rather than sharp edges 130, any type of "rabbit ear" tip design as discussed in the '674 application among others, including simply rounded edges or constant radius rounded edges.

Figure 11:
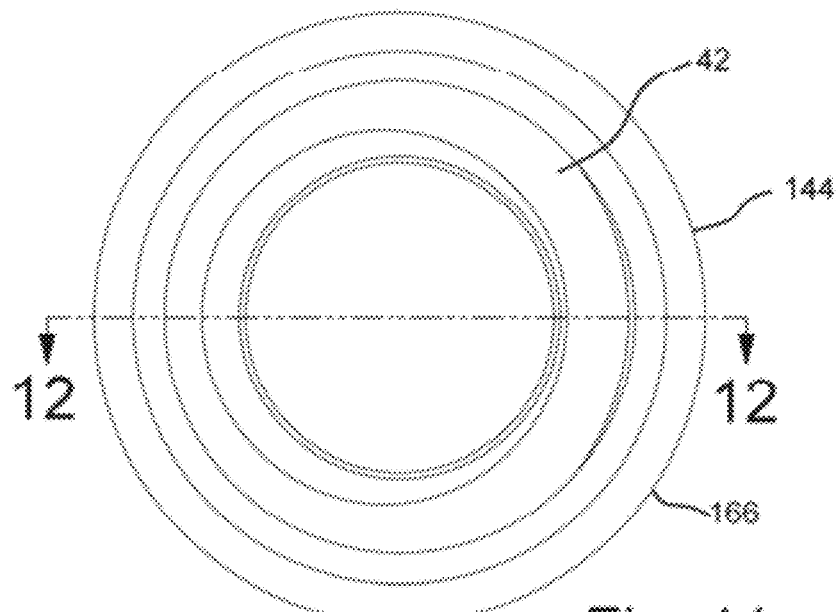
FIG. 11 is a top view of one embodiment of a shrouded spherical involute rotor pair using the disclosed involute surfaces.
Figure 12:
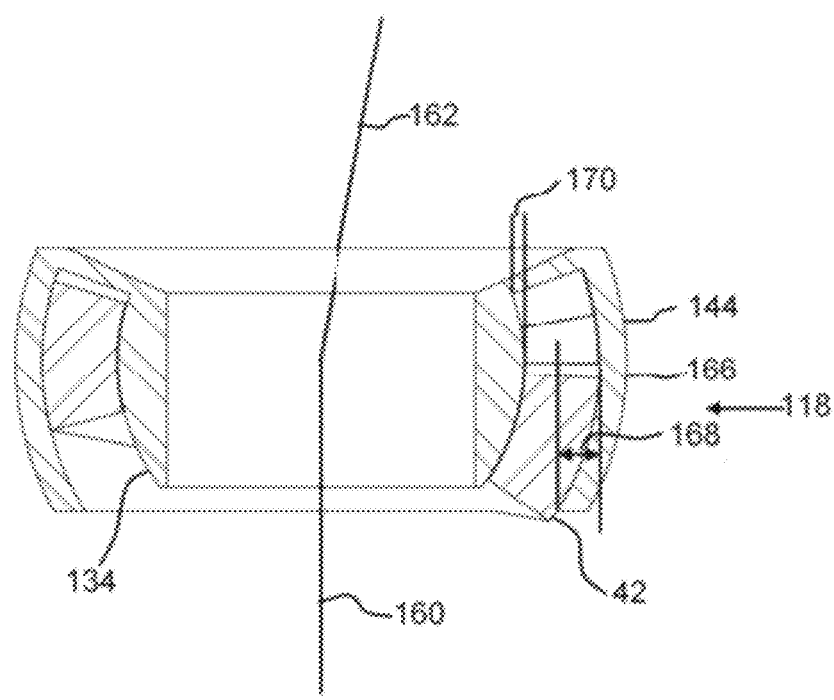
FIG. 12 is a cutaway view of a shrouded spherical involute rotor pair taken along line 12-12 of FIG. 11.
Figure 13:
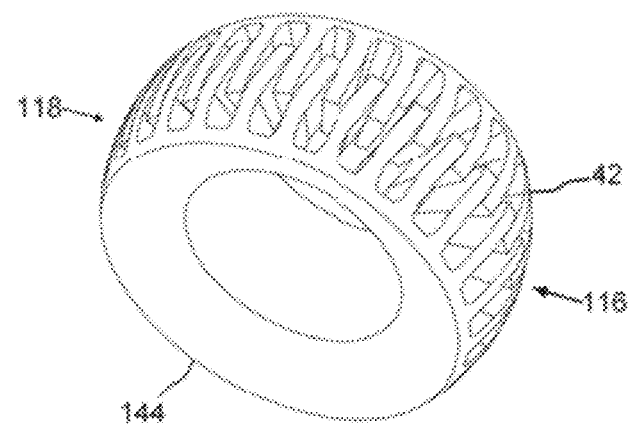
FIG. 13 is an isometric view of the embodiment of FIG. 11 with the outer shroud of the outer rotor removed.
Figure 22:
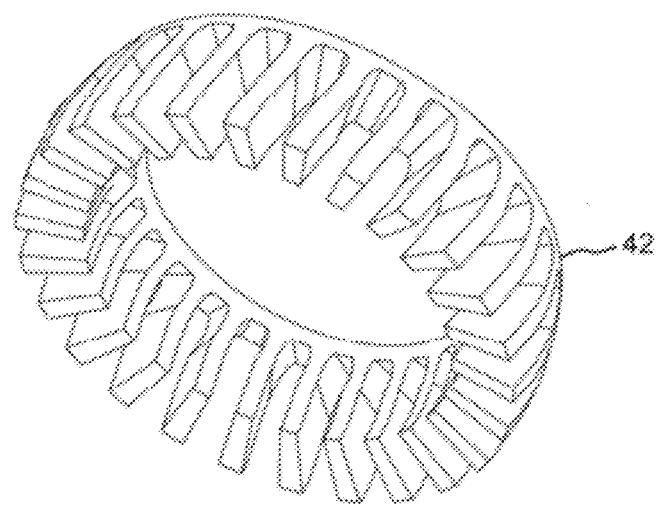
FIG. 22 is an isometric view of a rotor designed to cooperate with the rotor of the embodiment of FIG. 18.
Figure 23:
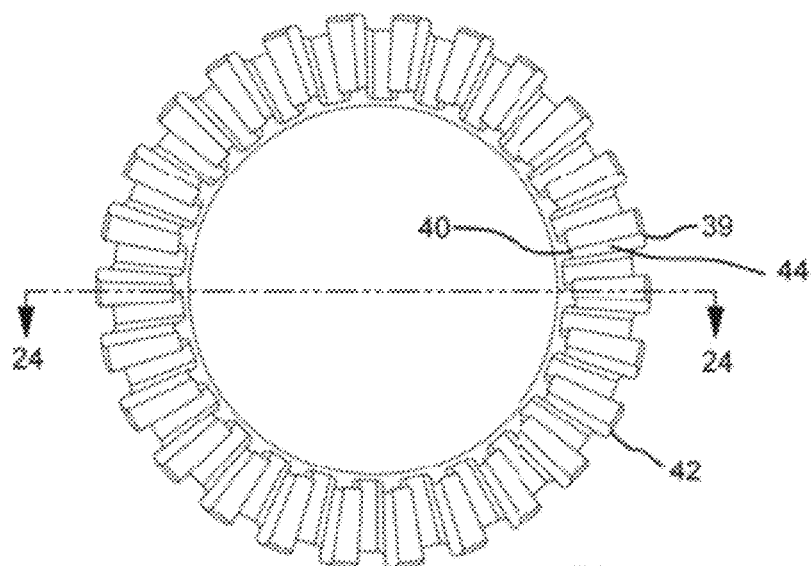
FIG. 23 is a top view of one of the inner rotor of the embodiment of FIG. 12.
Figure 24:
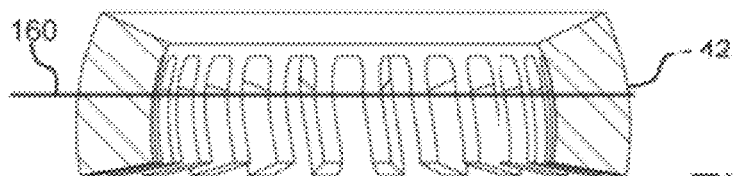
FIG. 24 is a cutaway view of one of the rotors of the embodiment of FIG. 23 taken along line 24-24.

As disclosed herein, FIGS. 11-24 represent a 26-toothed/lobed embodiment comprising two rotors including an outer or shroud gear 144 and an inner gear 42. The outer gear is shown in FIGS. 18-21, and the inner gear is shown in FIGS. 22-24. FIGS. 11-12 show both components with a shroud component 166, and FIGS. 13-17 show both components with the shroud component removed to more easily view the inner components. Not shown is an outer housing assembly, which could be similar to previous embodiments, such as those of the '196 patent the '674 application among others. One form of the unit utilizes back-face porting 132 and may utilize a shroud on only one rotor, or use seal blocks and have the fluid flow pass through the device from one radial or axial side to the other. Another design may incorporate a solid (unitary) through-shaft and indexed arrangement. Another embodiment could omit the indexer and utilize the spherical involute surfaces for torque transfer.

In the specific embodiment shown in FIG. 18-23, about 7 involute surfaces contact at any given time in the torque transfer direction as can be seen by the contacts 56-68 of FIG. 15, and a separate set of about 7 contacts occur for backlash removal on the radially opposite side of the device (gear pair). The number of lobes may be reduced and the lobes or teeth may be appropriately thickened, and still maintain more than one involute torque transfer contact surface at any given time (contact ratio greater than 1). The advantages of a design such as this over existing designs include:

Very low frictional contact the device to utilize lobe-to-lobe contacts rather than using a separate timing gear or indexer system.

Very favorable wear characteristics as the involute contact surfaces contact in a near-rolling arrangement, resulting in very low frictional "sliding".

Torque transfer occurs very tangentially, so as to minimize the axial force component due to torque.

The lobes may have a larger "overhang" 132 than the design disclosed in the '196 patent, but this "overhang" 132 can be accommodated in various ways. One accommodation is, for example, is by machining flats on the inner ball 134 before assembly etc. The shroud could be split like in previous designs such as described for example in U.S. patent application Ser. No. 13/162,436 incorporated herein by reference for supporting information.

FIGS. 11-12 show an embodiment with an outer rotor 144 which rotates about an axis 160, and an inner rotor 42 which rotates about an axis 162.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore we claim:
1. A spherical involute gear coupling comprising:
   a. a first gear having a first axis of rotation and a second gear having a second axis of rotation,
   b. the first gear and the second gear each comprising a plurality of teeth,
      i. the teeth having engagement surfaces configured to engage contact surfaces on teeth of the opposing gear, and wherein
      ii. the engagement surfaces comprise spherical involute curves,
   c. wherein a first set of teeth on the first gear, and a first set of teeth on the second gear contact on a first circumferential side of the first sets of teeth for torque transfer;
   d. wherein a second set of teeth on the first gear, and a second set of teeth on the second gear contact a second circumferential side of the second sets of teeth upon reversal of the gear coupling for backlash prevention; and
   e. wherein the first sets of teeth are radially opposed to the second sets of teeth.
2. The spherical involute gear coupling as recited in claim 1 wherein:
   a. the first gear comprises:
      i. an inner ring having an axis of rotation, a radially inward surface, a spherical radially outward surface;
      ii. wherein the teeth of the first gear extend radially away from the radially outward surface of the inner ring;
      iii. wherein each tooth of the first gear comprises a first circumferential surface;
      iv. wherein the first circumferential surface of each tooth of the first gear is a radial projection of a first spherical involute curve away from the axis of rotation of the inner ring;
   b. the second gear comprises:
      i. an outer ring having an axis of rotation, a spherical radially inward surface, a radially outward surface; and upper and lower axial sides;
      ii. a plurality of gear teeth extending radially away from the radially outward surface of the inner ring toward the axis of rotation of the outer ring; and
      iii. wherein the first circumferential surface of each gear tooth is a radial projection of a second spherical involute curve toward the axis of rotation of the outer ring.
3. The spherical involute gear coupling as recited in claim 1 wherein:
   a. the first gear comprises:
      i. an inner ring having a radially inward surface, a spherical radially outward surface; and upper and lower axial sides;
      ii. the teeth of the first gear extend radially away from the radially outward surface of the inner ring;
      iii. wherein each tooth of the first gear comprises a first circumferential contact surface;
      iv. wherein each tooth of the first gear comprises a root curve, and each root curve is a spherical involute curve;
   b. the second gear comprises:
      i. an outer ring having an axis of rotation, a spherical radially inward surface, a radially outward surface; and upper and lower axial sides;
      ii. a plurality of gear teeth extending radially away from the radially outward surface of the inner ring toward the axis of rotation of the outer ring; and
      iii. wherein each tooth of the second gear comprises a root curve, and each root is a spherical involute curve.
4. The spherical involute gear coupling as recited in claim 1 wherein a radially outward surface of the second gear is spherical.
5. The spherical involute gear coupling as recited in claim 1 wherein the spherical involute curves are axially symmetric about a bisection plane normal to the axis of rotation of the associated gear.
6. The spherical involute gear coupling as recited in claim 1 comprising:
   a. a backlash value dependant upon the axis of rotation of the second gear relative to the axis of rotation of the first gear by adjusting the axis of rotation of the second gear relative to the axis of rotation of the first gear.
7. The spherical involute gear coupling as recited in claim 1 where the axis of rotation of the first gear and the axis of rotation of the second gear are offset from co-linear and intersecting.
8. The spherical involute gear coupling as recited in claim 1 wherein the contact surfaces are radial projections of a spherical involute curve projected radially and non-linearly, through a radial projection curve.
9. The spherical involute gear coupling as recited in claim 8 wherein the radial projection curve is a spherical involute.
10. The spherical involute gear coupling as recited in claim 8 wherein
    a. the radial projection provides a convex contact surface on the first circumferential side of the teeth of the first gear; and
    b. the radial projection provides a concave contact surface on the first circumferential side of the teeth of the second gear.
11. The spherical involute gear coupling as recited in claim 8 wherein
    a. the radial projection provides a concave projection of a spherical involute curve forming a contact surface on the first circumferential side of the teeth of the first gear; and
    b. the radial projection provides a convex projection of a spherical involute curve forming a contact surface on the first circumferential side of the teeth of the second gear.
12. The spherical involute gear coupling as recited in claim 8 wherein
    a. the radial projection provides a linear projection of a spherical involute curve forming a contact surface on the first circumferential side of the teeth of the first gear; and
    b. the radial projection provides a convex projection of a spherical involute curve forming a contact surface on the first circumferential side of the teeth of the second gear.
13. The spherical involute gear coupling as recited in claim 1 wherein the first circumferential sides of each gear further comprise:
    a. surfaces defining bucket surfaces,
    b. where the bucket surfaces are formed by minimum required removal of material to allow intermeshing of the first and the second gears,
    c. minimum material removal of the gear tooth resulting in the bucket surface,
    d. wherein the bucket surface is defined by the motion of the periphery of an opposing gear tooth tip, as the first and second gears rotate on their respective axis which are offset from collinear, at equal rotational speeds.
14. The spherical involute gear coupling as recited in claim 13 wherein there is an interference fit between the tip of the opposing gear and the surface of the bucket surface.
15. The spherical involute gear coupling as recited in claim 13 wherein there is a prescribed gap between the tip of the opposing gear and the surface of the bucket surface.

16. The spherical involute gear coupling as recited in claim 1 where contact surfaces on each gear are joined together by smooth joining surfaces, joining surfaces on a first gear and on a second gear comprising:
   a. a first gear's engagement curves that lie in spherical planes, where each engagement curve is defined by a plurality of points, each point having an associated position derivative vector indicating a direction of tangency to the first gear's engagement curve, relative motion vectors at each point along the first gear's engagement curve, the relative motion vectors defined as the motion vectors of each point on the first gear's engagement curve measured with respect to a coordinate system rigidly fixed to the second gear, where the relative motion vectors are dependent on the relative rotational positions of the first gear with respect to the second gear; and;
   b. the second gear having a center rotation axis that is offset from co-linear to the first gear, the second gear rotating at a prescribed rotational speed with respect to the first gear, the second gear having a second protrusion connection engagement surface with a second set of engagement spherical curves positioned in the spherical planes of the second gear where the plurality of points forming the second gear's engagement curve measured on a coordinate system rigidly fixed to the second gear, each point of these plurality of points corresponds to a specific rotational position of the two gears, each point created at the geometric location where one of the first gear curve position derivative vectors is co-linear with one of the first gear curve relative motion vectors, where the first and second gear curves lie on equal diameter spherical planes, and further
   c. where the coordinates of the position derivative vectors and the relative motion vectors are the same defines a reference point, and the locus of these points on any given spherical plane determines the second gear's engagement curves on the corresponding spherical plane shared by the two gears.

17. The spherical involute gear coupling as recited in claim 1, further comprising: a substantially spherical outer shroud surrounding and partially encapsulating the gear teeth such that no fluid communication can occur across gear teeth.

18. A spherical involute gear coupling comprising
   a. a first gear having a first axis of rotation and a second gear having a second axis of rotation,
   b. the first gear and the second gear each comprising a plurality of teeth,
   c. the teeth having engagement surfaces configured to engage contact surfaces on teeth of the opposing gear, and wherein:
   d. the engagement surfaces comprise spherical involute curves,
   e. wherein a first set of teeth on the first gear, and a first set of teeth on the second gear contact on a first circumferential side of the first sets of teeth for torque transfer;
   f. wherein a second set of teeth on the first gear, and a second set of teeth on the second gear contact a second circumferential side of the second sets of teeth upon reversal of the gear coupling for backlash prevention; and
   g. wherein the first sets of teeth are radially opposed to the second sets of teeth;
   h. a substantially spherical outer shroud surrounding and partially encapsulating the gear teeth such that no fluid communication occurs across gear teeth
   i. surfaces defining ports in a back face of the gear for backface porting of fluids in a fluid transfer device.

19. The spherical involute gear coupling as recited in claim 1 further comprising crowning on the spherical involute surfaces to reduce stresses at the edges of the teeth.

* * * * *